US009119009B1

(12) United States Patent
Folkmanis et al.

(10) Patent No.: US 9,119,009 B1
(45) Date of Patent: Aug. 25, 2015

(54) TRANSMITTING AUDIO CONTROL DATA TO A HEARING AID (71) Applicant: Google Inc., Mountain View, CA (US)

(72) Inventors: Girts Folkmanis, San Francisco, CA (US); Paul Heninwolf, San Carlos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/086,089

(22) Filed: Nov. 21, 2013

Related U.S. Application Data (60) Provisional application No. 61/764,863, filed on Feb. 14, 2013.

(51) Int. Cl.
H04R 25/00 (2006.01)
(52) U.S. Cl.
CPC ...................... *H04R 25/55* (2013.01)
(58) Field of Classification Search
CPC ............. H04R 25/554; H04R 2225/39; H04R 2225/41; H04R 25/70; H04R 2420/07
USPC .................................................. 381/312, 315
See application file for complete search history.

(56) References Cited

U.S. PATENT DOCUMENTS

| 2006/0062412 | A1* | 3/2006 | Berg | 381/312 |
| 2011/0085687 | A1* | 4/2011 | Edgar | 381/315 |
| 2011/0200214 | A1* | 8/2011 | Knox et al. | 381/314 |
| 2013/0109909 | A1* | 5/2013 | van Gerwen | 600/25 |

* cited by examiner

Primary Examiner — Curtis Kuntz
Assistant Examiner — Norman Yu
(74) Attorney, Agent, or Firm — Shumaker & Sieffert, P.A.

(57) ABSTRACT

A computing device can detect an event associated with an alert sound, and responsive to detecting the event, identify the alert sound associated with the detected event. The alert sound includes one or more control tones that are configured to communicate occurrence of the event to a hearing aid device within audio range of the computing device. The computing device outputs the alert sound via a speaker of the computing device, such that a hearing aid device can detect the one or more control tones and, in response, the hearing aid device can generate and output an audible indication associated with the detected one or more control tones.

26 Claims, 5 Drawing Sheets

TRANSMITTING AUDIO CONTROL DATA TO A HEARING AID

This application claims the benefit of U.S. Provisional Application No. 61/764,863, filed Feb. 14, 2013, the entire content of which is incorporated herein by reference.

BACKGROUND

As smartphones, tablets, and other portable computerized devices have become more powerful and more commonly used, a wide variety and large number of applications for such devices have become available. Many smartphones and tablet computers often initially include several applications that provide a base set of functions, such as a telephone application, a camera application, a web browser application, and a navigation tool, and are affiliated with or are capable of connecting to one or more application stores or markets that provide a multitude of additional applications.

A user can generally interact with such applications by entering input using a presence-sensitive touchscreen display operatively coupled to or otherwise associated with the device. For example, the device can detect whether a finger is pressing a fixed-image touchscreen button, or can detect the presence and position of a finger at or near the presence-sensitive display, facilitating functions such as dialing a cell phone, navigating using a Global Positioning System (GPS) device, or typing using a virtual keyboard to perform tasks such as composing a message or browsing Internet content. Many applications also use an audio interface, such as a microphone and speaker used for a telephone application, or a speaker used to provide voice instructions, sound effects, or alert sounds.

However, in some situations, users wearing hearing aids may not hear a mobile device's alerts or other sounds, such as a ringing telephone, a calendar reminder tone, or a text message notification, particularly if the mobile device's volume is not set high or if the mobile device is in a pocket or handbag. Noisy environments can make it even more difficult for a hearing aid user to hear alert sounds, and the frequency range of alert sounds often falls outside normal speech frequencies for which many hearing aids are configured. Alert sounds produced by a carried mobile device may therefore go unnoticed, resulting in missed phone calls, missed calendar appointments, and slow response to text or voice messages.

SUMMARY

In one example embodiment, a device includes at least one processor to detect an event associated with an alert sound, and responsive to detecting the event, to identify the alert sound associated with the detected event. The alert sound includes one or more control tones configured to communicate occurrence of the event to a hearing aid device within audio range of the mobile computing device. The device is further operable to output, via a speaker of the device, the alert sound.

In another example, a method includes detecting, by a computing device, an event associated with an alert sound, and, responsive to detecting the event and by the computing device, identifying an alert sound associated with the detected event, wherein the alert sound comprises one or more control tones configured to communicate occurrence of the event to a hearing aid device within audio range of the computing device. The method also includes outputting, by the computing device and to be played by a speaker operatively coupled to the computing device, the alert sound comprising the one or more control tones.

In another example, a method includes detecting, by a hearing aid device, one or more control tones comprising at least part of an alert sound, the alert sound received from a computing device and associated with a computing device event, and, responsive to detecting the one or more control tones and by the hearing aid device, generating an audible indication associated with the detected one or more control tones, the audible indication comprising a sound different than the one or more control tones. The method further includes outputting the audible indication via a speaker of the hearing aid device, such that a user of the hearing aid device is audibly notified of the computing device event.

In a further example, a hearing aid device includes a processor, configured to detect one or more control tones comprising at least part of an alert sound, the alert sound received from a computing device and associated with a computing device event, and, responsive to detecting the one or more control tones, generate an audible indication associated with the detected one or more control tones, the audible indication comprising a sound different than the one or more control tones. The processor is also configured to output the audible indication via a speaker of the hearing aid device to audibly notify a user of the hearing aid device of the computing device event.

The details of one or more examples are set forth in the accompanying drawings and the description below. Other features, objects, and advantages will be apparent from the description and drawings, and from the claims.

DETAILED DESCRIPTION

In the following detailed description of example embodiments, reference is made to specific example embodiments by way of drawings and illustrations. These examples are described in sufficient detail to enable those skilled in the art to practice what is described, and serve to illustrate how various features may be applied to various purposes or embodiments. Other embodiments exist, and logical, mechanical, electrical, and other changes may be made. Features or limitations of various embodiments described herein, however important to the example embodiments in which they are incorporated, do not limit other embodiments, and any reference to the elements, operation, and application of the examples serve only to define these example embodiments. The following detailed description does not, therefore, limit the scope of what is claimed.

Interfaces on small electronic devices such as smartphones, tablets, Global Positioning System (GPS) devices, and other such electronic systems often include a variety of elements, including speakers and microphones, fixed buttons, and presence-sensitive displays that can be easily adapted to provide instruction and other information to the user. Speakers and microphones can be used to produce or create sounds, such as to provide for voice communication using a telephone application, to provide spoken directions using a Global Positioning System (GPS) application, or providing sound effects or alert sounds. Presence-sensitive displays can display graphics or video and receive various types of input, such as receiving a touch input at a region of the display that is associated with a displayed object or graphic, thereby providing an intuitive interface that requires very little user training to effectively use. Presence-sensitive displays are able to detect the presence of a finger, stylus, or other object at or near the surface of the display, enabling the devices to detect and respond to input based on characteristics such as the position and movement of a touch.

Providing input via a presence-sensitive display includes, in one example, a displayed traditional "QWERTY" keyboard having touch input areas associated with each displayed key, allowing the presence-sensitive display to receive inputs from a user selectively actuating the presence-sensitive portion associated with each key. Similarly, the display can receive input from a user comprising various shapes or gestures, such as by the user tracing a finger or stylus across the display. Speakers are often used to provide additional feedback for presence-sensitive display input, such as outputting a click sound or other sound as each key on a touchscreen keyboard is actuated.

Speakers are also commonly used to provide various sound effects and alert sounds to users, such as a ring tone for a telephone application, an alert indicating a calendar appointment is nearing, and an alert sound when a text message is received. These tones can draw a user's attention to the mobile device when the user may be busy with other things, indicating to the user that the mobile device has detected an event that may be time-sensitive to the user. For example, a user may wish to be alerted to an incoming phone call in time to answer the call rather than let the call be answered by voicemail, or may wish to be reminded of a calendar event a certain amount of time before the event occurs.

In some situations, a user wearing a hearing aid may not hear many alert sounds, ringtones, and other audible indications that a typical mobile device provides, and so may not be able to respond to such alerts as quickly as is desired. Many alert sounds include significant audio information at frequencies outside the normal range of speech, and so are not amplified or are amplified less than normal speech frequencies in many hearing aids. Noisy environments, such as restaurants, offices, or shopping centers can also reduce a hearing aid user's ability to detect an alert sound from a mobile device, as these noises can mask alert sounds, making them difficult to hear.

Some examples described herein therefore provide for outputting audio control tones from a mobile device to a hearing aid, enabling a hearing aid to receive the audio control tone and generate an audible indication of an event that is output to a hearing aid user. In a more detailed example, a mobile computing device, such as a smartphone, detects an event and outputs an associated alert sound such as a ringtone, calendar appointment reminder sound, or text message alert sound through a speaker. In one example implementation, the alert sound is configured to indicate to the hearing aid device, through an included control tone, an event associated with the control tone. In this example, the hearing aid receives the alert sound that includes the control tone indicating the associated event, and as a result of detecting the control tone the hearing aid device generates and outputs an audible indication of the event through a speaker of the hearing aid device. The audible indication may be designed to be audible to the hearing aid user. By outputting the audible indication, the hearing aid device can notify the user of the event irrespective of whether a user can hear the alert sound from the mobile device as amplified through the hearing aid.

Figure 1:
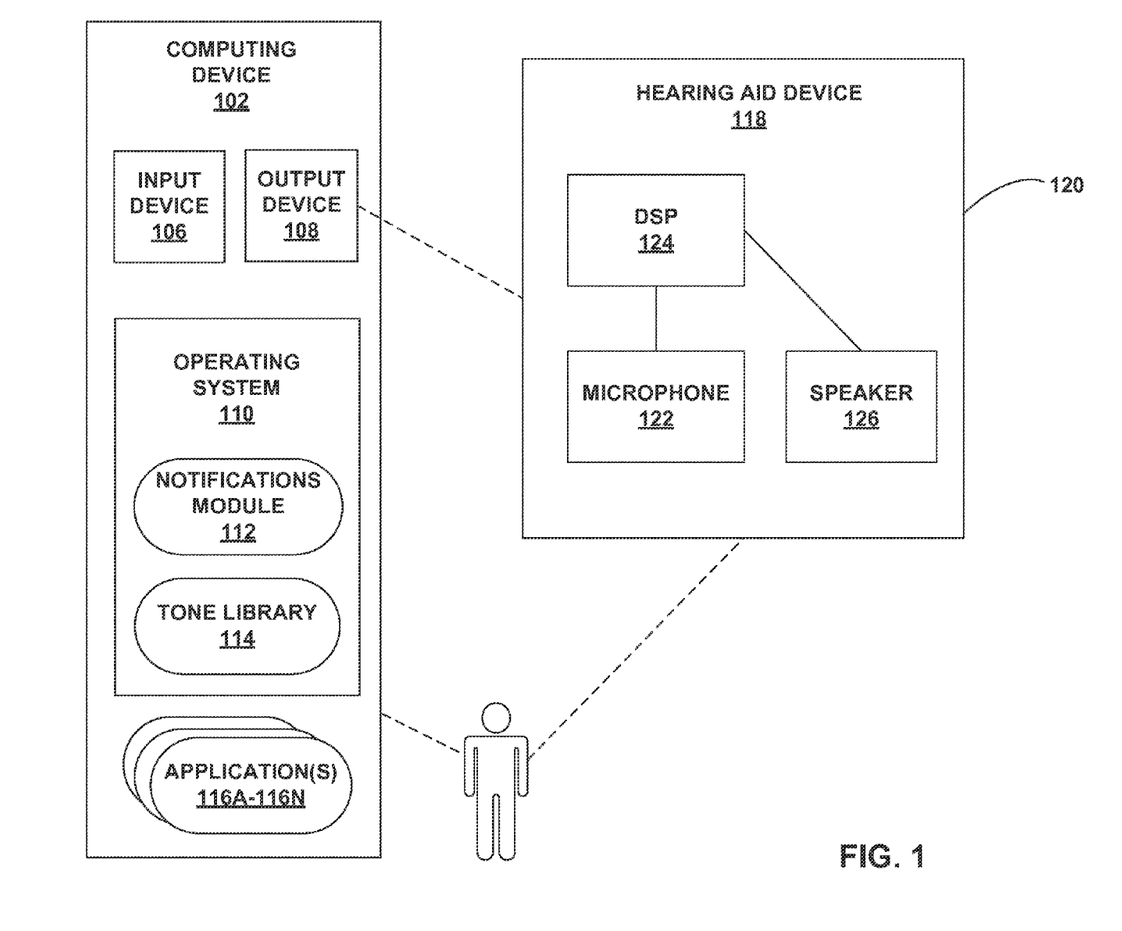
FIG. 1 is a block diagram illustrating a computing device that may be used to output user alert sounds comprising one or more control tones to a hearing aid device, consistent with an example embodiment.

FIG. 1 is a block diagram illustrating one example of a computing device that may be used to communicate user alert sounds comprising one or more control tones to a hearing aid device, consistent with an example embodiment. In some examples, computing device 102 receives input from a user associated with computing device, such as by receiving inputs via a presence-sensitive display or other input. In some examples, the user may have one or more accounts with one or more services, such as a social networking service and/or telephone service, and the accounts may be registered with computing device 102.

Examples of computing device 102 may include, but are not limited to, portable or mobile devices such as mobile phones (including smartphones) as shown here, tablet computers, laptop computers, desktop computers, tablet computers, smart television platforms, personal digital assistants (PDAs), servers, mainframes, and the like. Computing device 102, in some examples, can include one or more input devices 106, and one or more output devices 108. Input devices 106 include in various embodiments inputs such as one or more presence-sensitive displays such as touchscreens, microphones, buttons, keys, and other such input devices. Output devices 108 include user outputs such as one or more speakers, displays, and other such output devices. A display of computing device 102 may be, for example, a presence-sensitive display operable to display graphics and to receive user input through touch. Other input and output devices include a GPS receiver, a cellular radio modem, Bluetooth, a near-field communication (NFC) radio, and other such devices. Other examples of a computing device 102 that implement functions described herein may include additional components not shown in FIG. 1, or lack elements shown in FIG. 1.

Computing device 102 may include various applications that can be executed by the computing device, such as an operating system 110 and other applications 116A-116N. In some examples, operating system 110 is configured to provide various services and resources to applications executing on the mobile device, such as a notifications service via notifications module 112, and one or more alert sounds such as ringtones in tone library 114. The computing device further includes one or more applications 116A-116N, such as a telephone application, an alarm application, a calendar application, a text messaging application, and other applications.

In operation, the computing device 102 generates various events that are associated with an audible indication to the user, such as outputting a ringtone as a result of receiving a phone call, outputting an alert sound upon receiving a text message, outputting an alarm sound at a designated time, outputting a low battery alert sound, or outputting an alert sound as a reminder of a calendar event. Alert sounds such as these are generated in some embodiments by the respective applications, such as a telephone application, a text messaging application, an alarm application, and a calendar application. In alternate embodiments, an operating system service such as notifications module 112 receives the notification and generates an alert sound, such as a tone from tone library 114.

In some situations the alert sounds generated by computing device 102 may be difficult for a hearing aid user to hear, however, particularly in noisy environments or where the alert sounds have significant audio content outside the normal speech frequency range that hearing aid devices may be designed to amplify. Some example embodiments described herein encode at least some alert sounds generated by the computing device 102 with information associated with a computing device event, such that the encoded information can be detected by a hearing aid device 118.

In some examples, computing device 102 generates alert sounds that are preconfigured to include control tone information, such as by generating ringtones or other alert sounds that have been provided with control tone information embedded in the alert sound, or that have had control tones encoded in the alert sound such as by an application 116 executing on the computing device. In other examples, the notifications module 112 or another operating system or application service is operable to add control tones to alert sounds, such as by outputting control tones and alert sounds simultaneously or sequentially.

The hearing aid device 118 receives one or more control tones in an alert sound received from computing device 102 though microphone 122, and detects the presence of a control tone in the alert sound using, in this example, Digital Signal Processor (DSP) 124. In response to detecting the control tone in the alert sound, hearing aid device 118, DSP 124 generates and outputs an audible indication of the event associated with the computing device event, and hearing aid device 118 outputs the audible indication of the event through speaker 126. In this example, the output audible indication of the event is not merely an amplified version of the control tone or the alert sound received through microphone 122, but is a different audible indication of the event generated within hearing aid device 118. That is, the audible indication may have different sound characteristics (e.g., tone, pattern, frequency, duration) than the alert sound or control tone, such that the audible indication is more readily heard by the user of the hearing aid device 118. Hearing aid device 118 may output the audible indication in such a way as to make the audible indication stand out over the existing sound level, allowing the user to more readily notice the computing device event.

In a further example, in response to detecting one or more control tones in the alert sound, hearing aid device 118 may attenuate sounds received via microphone 122 other than the alert sound while the hearing aid device 118 plays the audible indication of the event through speaker 126. This may reduce a masking effect that other ambient sounds might have on the audible indication of the event and better allow the audible indication to stand out over the existing sound level, allowing the user to more readily notice the computing device event.

Outputting control tones as part of an alert sound from computing device 102 may enable hearing aid device 118 to detect the control tone and output an audible indication of an event in response. In some examples, hearing aid device 118 may associate the control tone with a particular one of a plurality of pre-defined events for computing device 102 and output a corresponding audible indication the event. The audible indication of an event is in some examples generated within the hearing aid device 118, such as by Digital Signal Processor (DSP) 124, in response to detecting the control tone. Moreover, computing device 102 may output multiple control tones, causing hearing aid device 118 to detect and output, e.g., sequentially, one or more corresponding audible indications for multiple events associated with the control tones.

In a further embodiment, the control tones are associated with user-initiated events in computing device 102, such as in response to detecting input by a user using an application 116 to generate a control tone, or an alert sound including a control tone, to change a setting or parameter on hearing aid device 118. For example, the user may wish to change the hearing aid volume, noise suppression settings, or amplification frequency response of the hearing aid, but may have difficulty using controls mounted on a hearing aid being worn, e.g, within an ear of the user. The user in this example is able to use an application 116 executing on computing device 102 to output control tones that can be detected by hearing aid device 118, and which are associated with a desired change to a setting or parameter associated with the hearing aid device. Hearing aid device 118 receives the control tone via microphone 122, and detects the control tone associated with the parameter change using DSP 124, which changes the parameter of hearing aid device 118 based on the control tone received. Example parameter changes include increasing or decreasing the volume, or setting the volume to a specific level.

In some example aspects, the control tone may include identification information, such as identity information associated with hearing aid device 118, the computing device 102, or the user. In some examples, the control tone may be encrypted and/or signed. Hearing aid device 118 can decode the identification information encoded in a control tone, and compare the identification information against identification information configured in hearing aid device 118, such as configured information indicating a particular computing device 102 associated with hearing aid device 118. In response to determining that the identification information encoded in the control tone matches the identification information configured in hearing aid device 118, the hearing aid may act upon the control tone, whereas in response to determining that the identification information encoded in the control tone does not match the identification information configured in hearing aid device 118, the hearing aid may ignore the control tone. As a result, hearing aid device 118 to generate user notifications or change parameters in response to detecting only those control tones that are associated with hearing aid device 118 or the user, or are from an approved or associated computing device 102. This can avoid situations in which a user's hearing aid device 118 accidentally receives control tones from unrelated computing devices nearby.

Information can be encoded in a control tone in various examples using various encoding methods, such as frequency encoding, amplitude encoding, or phase encoding information in the control tone. In some example aspects, a control tone can include error management information, such as one or more parity bits or error correction bits. Including error management information in the control tone can enable the hearing aid to reduce the chance of inaccurately detecting information encoded in a control tone, reducing the chance of unintended generation of a user alert sound or unintended change in hearing aid parameters. In some examples, the control tone is repeated more than once during the alert sound output from computing device 102, improving the chance that hearing aid device 118 accurately receives and detects the control tone. In this and other examples, hearing aid device 118 may be configured not to respond to a control tone unless the same control tone is received a specified number of times within a specific period of time. For example, hearing aid device 118 may be configured not to respond to a control tone unless the same control tone is received at least twice within several seconds.

Use of a control tone to communicate occurrence of an event in computing device 102 to hearing aid device 118 enables hearing aid device 118 to generate user alert sounds in response to the event using hardware, such as a microphone and a Digital Signal Processor (DSP) found in most hearing aid devices. Because the techniques of this disclosure use existing audio devices for communication, expensive additional hardware such as Bluetooth or other wireless radio frequency hardware are not required to be incorporated into hearing aid device 118. This approach may save hardware cost, circuit board space, and power consumption in hearing aid device 118 relative to other such options.

Figure 2:
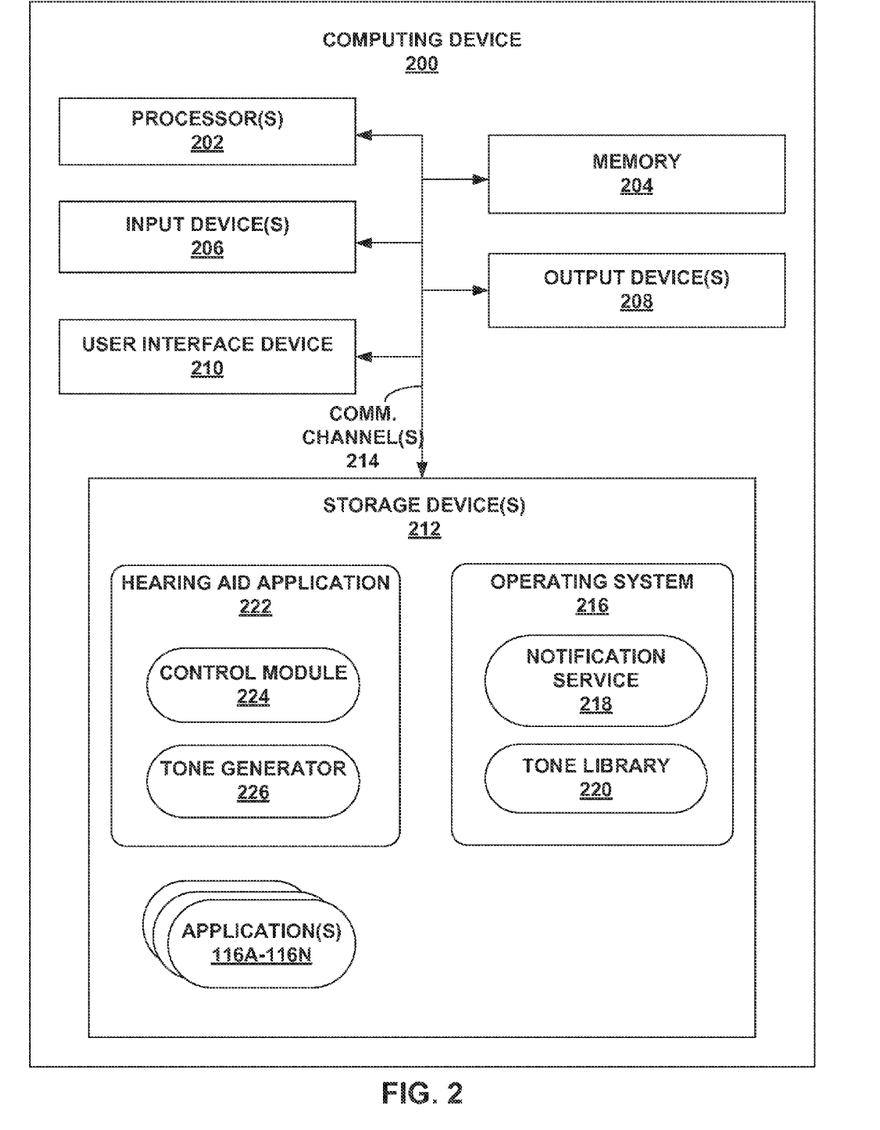
FIG. 2 is a block diagram illustrating further details of one example of a computing device, consistent with an example embodiment.

FIG. 2 is a block diagram illustrating further details of one example of a computing device, such as the computing device shown in FIG. 1. FIG. 2 illustrates only one particular example of computing device 200, and many other examples of computing device 200 may be used in other examples. Although computing device 200 is shown in FIGS. 1 and 2 as a standalone computing device, computing devices 102 and 200 may be any component or system that includes one or more processors or another suitable computing environment for executing software instructions in other examples, and need not include one or more of the elements shown in these Figures.

As shown in the specific example of FIG. 2, computing device 200 includes one or more processors 202, memory 204, one or more input devices 206, one or more output devices 208, one or more communication modules 210, and one or more storage devices 212. Computing device 200, in one example, further includes an operating system 216 executable by computing device 200. The operating system includes in various examples services such as a notification service 218 and a tone library 220. One or more applications, such as hearing aid application 222 are also stored on storage device 212, and are executable by computing device 200. In some examples, input devices 206 and output devices 208 are similar to input device 106 and output device 108 of FIG. 1, and hearing aid application 222, along with control module 224 and tone generator 226, are similar to application 116 of FIG. 1.

Each of components 202, 204, 206, 208, 210, and 212 may be interconnected (physically, communicatively, and/or operatively) for inter-component communications, such as via one or more communications channels 214 ("COMM. CHANNEL(S) 214"). In some examples, communication channels 214 include a system bus, network connection, interprocess communication data structure, or any other channel for communicating data. Applications such as hearing aid application 222 and operating system 216 may also communicate information with one another as well as with other components in computing device 200.

Processors 202, in one example, are configured to implement functionality and/or process instructions for execution within computing device 200. For example, processors 202 may be capable of processing instructions stored in storage device 212 or memory 204. Examples of processors 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 212 may be configured to store information within computing device 200 during operation. Storage device 212, in some examples, is described as a computer-readable storage medium. In some examples, storage device 212 comprises temporary memory, meaning that a primary purpose of storage device 212 is not long-term storage. Storage device 212, in some examples, is described as a volatile memory, meaning that storage device 212 does not maintain stored contents when computing device 200 is turned off. In other examples, data is loaded from storage device 212 into memory 204 during operation. Examples of volatile memories include random access memories (RAM), dynamic random access memories (DRAM), static random access memories (SRAM), and other forms of volatile memories known in the art. In some examples, storage device 212 is used to store program instructions for execution by processors 202. Storage device 212 and memory 204, in various examples, are used by software or applications running on computing device 200 (e.g., application 222) to temporarily store information during program execution.

Storage device 212, in some examples, includes one or more computer-readable storage media, that may be configured to store larger amounts of information than volatile memory. Storage device 212 may further be configured for long-term storage of information. In some examples, storage devices 212 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 200, in some examples, also includes one or more communication modules 210. Computing device 200, in one example, utilizes user interface device 210 to communicate with external devices via one or more networks, such as one or more wireless networks. User interface device 210 may be a network interface card, such as an Ethernet card, an optical transceiver, a radio frequency transceiver, or any other type of device that can send and/or receive information. Other examples of such network interfaces may include Bluetooth, 3G or 4G, WiFi radios, and Near-Field Communications (NFC), as well as Universal Serial Bus (USB). In some examples, computing device 200 utilizes user interface device 210 to wirelessly communicate with an external device such as hearing aid device 118 of FIG. 1, or any other computing device.

Computing device 200, in one example, also includes one or more input devices 206. Input device 206, in some examples, is configured to receive input from a user through tactile, audio, or video feedback. Examples of input device 206 include a presence-sensitive display, a mouse, a keyboard, a voice responsive system, video camera, microphone or any other type of device for detecting input from a user. In some examples, a presence-sensitive display includes a touch-sensitive screen commonly known as a touchscreen.

One or more output devices 208 may also be included in computing device 200. Output device 208, in some examples, is configured to provide output to a user using tactile, audio, or video stimuli. Output device 208, in one example, includes a presence-sensitive display, a sound card, a video graphics adapter card, or any other type of device for converting a signal into an appropriate form understandable to humans or machines. Additional examples of output device 208 include a speaker, a light-emitting diode (LED) display, a liquid crystal display (LCD), or any other type of device that can generate output to a user. In some examples, input device 206 and/or output device 208 are used to provide or interact with operating system services, such as graphical user interface service 218, such as via a presence-sensitive display.

In some examples, a presence-sensitive display may detect an object at or near a surface of the presence sensitive display, such as detecting whether a finger is present pressing a fixed-image touchscreen button or detecting the presence and position of a finger. Some presence-sensitive displays can also detect the presence of elements other than a finger, such as a stylus used to generate a digital signature, select objects, or perform other functions on a touchscreen display. Use of a presence-sensitive display allows an electronic device to present different buttons, images, or other regions that can be selected, manipulated, or actuated by touch. Presence-sensitive displays can therefore provide an effective user interface for cell phones, GPS devices, personal digital assistants (PDAs), computers, ATM machines, and other devices.

Presence-sensitive displays are often used for presentation of graphic input objects such as keyboards, numeric keypads, and other objects on mobile devices such as cellular telephones or smartphones, such that the presence-sensitive display is operable to receive input through sensing a presence or touch at a presented graphic input object. Presence-sensitive displays can also enable a user to provide input by drawing shapes or making gestures, such as by pinching in or out on a displayed object to perform a zoom, or by drawing a graphical object.

Computing device 200 may include operating system 216. Operating system 216, in some examples, controls the operation of components of computing device 200, and provides an interface from various applications such as GPS application 222 to components of computing device 200. For example, operating system 216, in one example, facilitates the communication of various applications such as hearing aid application 222 with processors 202, communication unit 210, storage device 212, input device 206, and output device 208. As shown in FIG. 2, hearing aid application 222 may correspond to application 116, as described in FIG. 1. Applications such as hearing aid application 222 may each include program instructions and/or data that are executable by computing device 200. As one example, hearing aid application 222 and its control module 224 and tone generator 226 may include instructions that cause computing device 200 to perform one or more of the operations and actions described in the examples presented herein.

For example, in one embodiment computing device 200 is a mobile device such as a smartphone, that includes a hearing aid application 222 that includes a control module 224 and a tone generator 226. In some examples, tone generator 226 receives data indicative of inputs from a user of computing device 220, such as inputs to create or modify one or more audible events (e.g., ringtones) from tone library 220 to include one or more control tones associated with a particular mobile device event. Notification service 218 may receive data indicative of inputs from the user configuring computing device 200 to use the newly created or modified ringtone as an alert sound for the particular mobile device event, such as by modifying a setting in notification service 218. This can allow the user to associate an event with a customized alert sound suited to their needs. Although described for purposes of example in terms of a "ringtone," the tone being created or modified may be a tone used for any type of computing device event, including an incoming phone call, a calendar event, an alarm, a received text message, or other event. For example, the user may adjust settings of computing device 220 by selecting a "hearing aid" ringtone provided by the computing device 220, to be used for signaling one or more mobile device events.

When the event occurs and operating system 216 or an application 116 sends an event notification to notification service 218, notification service 218 causes output device 208 (e.g., one or more speakers) to play the alert sound associated with the event that includes the one or more control tones, such that a hearing aid device near the computing device 200 may receive and identify the control tone. This enables the hearing aid device in turn to create an audible indication of the event in response to detecting the control tone and output the audible indication to a user, notifying the user of the event.

In another example, the event comprises receiving an indication by a user of a desired change in hearing aid device configuration via control module 224 of hearing aid application 222, such as to change one or more operational parameters of the hearing aid device, such as a volume level, a noise suppression level, or a specific frequency amplification (e.g., frequencies to be amplified by the hearing aid device), for example. For example, the computing device may include an application for configuring the settings of the hearing aid device, such as by providing an interface for changing a program or mode of the hearing aid, where the programs or modes are associated with different settings for one or more operational parameters. In these example, in response to receiving the indication, notification service 218 outputs the user alert sound that includes one or more control tones reflecting the changed operational parameter settings, and in response to receiving the user alert sound and detecting the control tones, the hearing aid device changes the setting in response to the event notification. In some examples, the hearing aid device confirms that the setting has been changed by providing an audible indication, such as a beep.

In some examples, the one or more control tones comprise an inaudible part of a user alert sound, such that the user alert sound will sound like a typical ringtone or other alert sound when a user hears the user alert sound. That is, in such examples, a human user may be unable to hear the control tones. For example, computing device 200 may play the control tones at one or more ultrasonic frequencies. The control tone in some further examples is encoded in the user alert sound, such as by using phase modulation, frequency modulation, or amplitude modulation of one or more tones in the control tone. The control tone in some examples includes error management information, such as parity, checksum, or other error correction or identification data. In some examples, the control tones may encode information identifying a type of the event. The hearing aid device may then play different audible indications for different types of events. Alternatively, the control tones may not indicate an event type, and the hearing aid device may play the same audible indication for all types of events, prompting the user to look at the computing device for further information regarding the event.

In some examples, computing device 200 may play the control tone repeated over time, such that a hearing aid device that does not detect or identify a control tone when first output from computing device 200 may identify a repeated control tone. As one example, the computing device 200 may repeat the signal once every 0.5 seconds for 5 seconds.

The control tone in some examples also contains user or device identification, to prevent unintended hearing aid actuation. For example, in one embodiment hearing aid application 222 is configured with an identification code (such as a serial number) that is also stored at an associated hearing aid device, and encodes the identification code in the one or more control tones in the user alert sound. When the hearing aid device receives the one or more control tones, the hearing aid device may compare its known identification code to the identification code encoded in the one or more received control tones, and performs an action associated with the received control tone only if the identification code encoded in the one or more control tones matches the known identification code.

As another example, the control tone may be encrypted and/or signed, which may aid in preventing unintended hearing aid actuation.

The computing device 200 comprises, in various examples, a mobile phone, a smartphone, a tablet computer, a laptop computer, a personal computer, a Personal Digital Assistant (PDA), or a Global Positioning System (GPS) device such as a standalone GPS or in-car GPS device.

The examples described herein may be implemented, at least in part, in hardware, software, firmware, or any combination thereof. For example, the described methods may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the examples described herein.

Such hardware, software, and firmware may be implemented within the same device or within separate devices to support the various examples described herein. In addition, any of the described units, modules or components may be implemented together or separately as discrete but interoperable logic devices. Depiction of different features as modules or units is intended to highlight different functionality and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The examples described herein may also be embodied or encoded in an article of manufacture including a computer-readable storage medium or computer-readable storage device encoded with instructions. Instructions embedded or encoded in an article of manufacture including an encoded computer-readable storage medium or storage device, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

In some examples, computer-readable storage media may comprise non-transitory media. The term "non-transitory" indicates that the storage medium is tangible and is not embodied in a carrier wave or a propagated signal. In certain examples, a non-transitory storage medium may store data that can, over time, change (e.g., in memory or nonvolatile memory).

Although shown in FIG. 2 as a stand-alone computing device 200 for purposes of example, a computing device may be any component or system that includes a processor 202 or other suitable computing environment for executing software instructions and, for example, need not include user interface device 210.

As described above, in some examples, computing device 200 may output graphical content for display at a presence-sensitive display that is coupled to computing device 200 by a system bus or other suitable communication channel. Computing device 200 may also output graphical content for display at one or more remote devices (not shown), such as a projector, projector screen, tablet device, and visual display device. For instance, computing device 200 may execute one or more instructions to generate and/or modify graphical content in accordance with techniques of the present disclosure. Computing device 200 may output the data that includes the graphical content to a communication unit (not shown). The communication unit may send the data to one or more of the remote devices, such as a projector, projector screen, tablet device, and/or visual display device. In this way, processor 202 may output the graphical content for display at one or more of the remote devices. In some examples, one or more of the remote devices may output the graphical content at a presence-sensitive display that is included in and/or operatively coupled to the respective remote devices.

Figure 3:
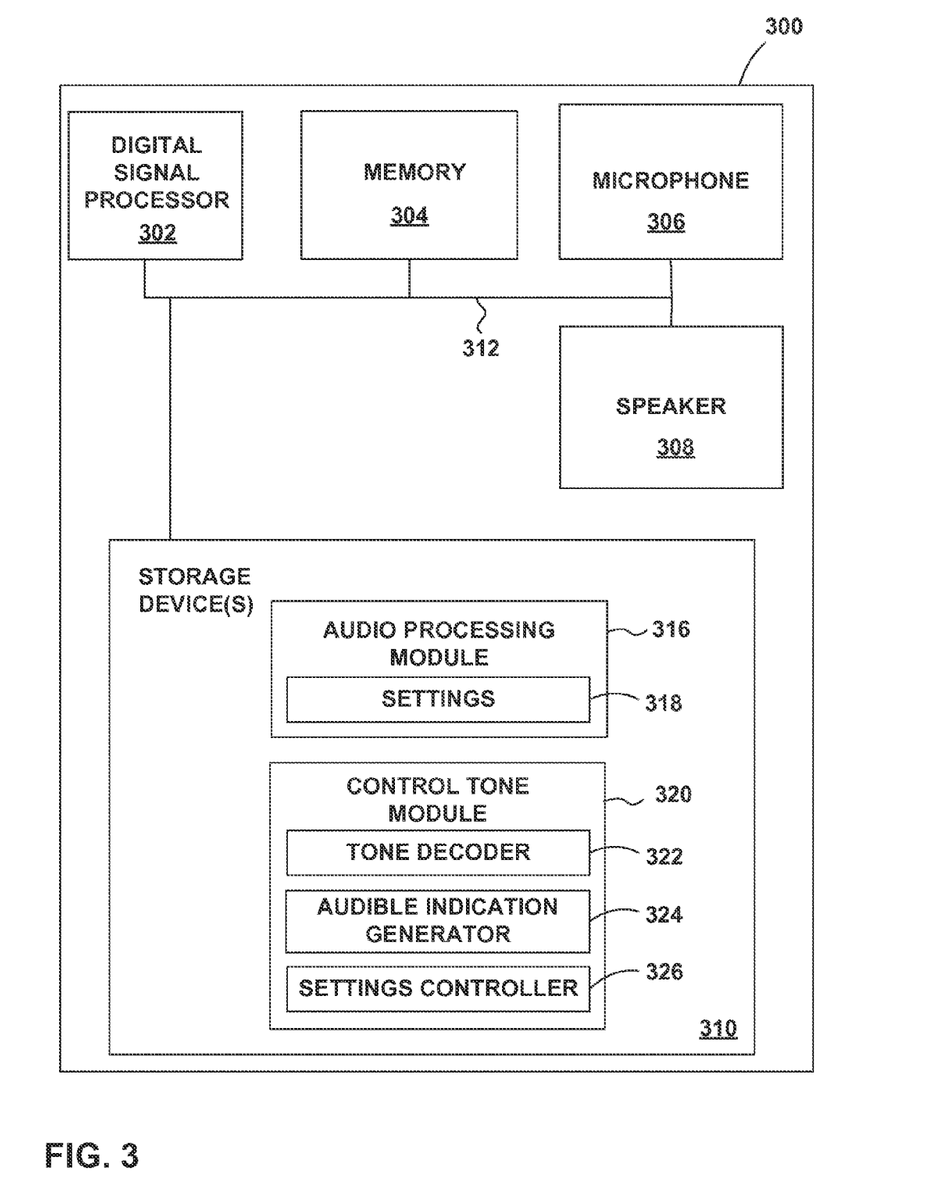
FIG. 3 is a block diagram illustrating further details of one example of a hearing aid device, consistent with an example embodiment.

FIG. 3 is a block diagram illustrating further details of a hearing aid device, such as hearing aid device 118 shown in FIG. 1. FIG. 3 illustrates only one particular example of hearing aid device 300, and many other examples of hearing aid device 300 may be used in other examples. FIG. 3 contains many elements similar to those found in FIG. 2, and the descriptions of such elements in various examples further apply to various examples of the hearing aid device 300. Although shown in FIG. 3 as a standalone device, hearing aid device 300 in other examples may be any component or system that includes one or more processors, or another suitable environment, and need not include one or more of the elements shown in these Figures.

In this example, hearing aid device includes one or more processors such as digital signal processor 302, memory 304, microphone 306, speaker 308, and one or more storage devices 310. The devices are linked by connections 312, such as a bus, storage interface, or other suitable connections. Storage device 310 has instructions stored thereon, including an audio processing module 316 that includes one or more settings 318, and a control tone module 320 that includes a tone decoder 322, an audible indication generator 324, and a settings controller 326.

In operation, digital signal processor 302 executes program instructions such as audio processing module code and control tone module code that are loaded from storage device 310 into memory 304. Audio processing module 316 includes, in various embodiments, audio processing instructions operable to process audio signals received via microphone 306 for amplification and output via speaker 308. In one such example, the audio processing module is operable to apply various filtering algorithms to filter out background noise, to adjust the frequency response to match human speech frequencies, and to adjust the volume, tone, and other such audio parameters. The various filters, frequency response profiles, and other such settings are stored in settings 318. When sound is received via microphone 306, digital signal processor 302 processes a digitized representation of the sound using the configured settings to generate output sound that is played through speaker 308, helping a user hear sounds such as speech.

Control tone module 320 further executes on digital signal processor 302, and in some examples is integrated with audio processing module 316. The control tone module 320 in this example includes a tone decoder 322 that monitors data representing sound received through microphone 306 to detect control tones, and decodes and identifies the control tone if a control tone is detected. Upon detecting a control tone associated with an event that is associated with notifying a user of the event, the audible indication generator 324 generates an audible indication of the event and outputs the audible indication through speaker 308. The tone decoder 322 detects and identifies the control tone, and the control tone module 320 takes appropriate action based on the control tone received. In one example, the control tone is associated with a user alert, and the audible indication generator 324 generates an audible indication of the alert and outputs it through speaker 308. In another example, the control tone comprises a change in hearing aid device settings 318, and the settings controller 326 is operable to change the setting 318 associated with the control tone, and in a further example, settings controller 326 can provide an audible indication of the setting change through audible indication generator 324 and speaker 308.

The techniques of this disclosure enable the hearing aid device 300 to receive audio including control tones via microphone 306, identify control tones in the received audio, and perform various actions such as changing settings and/or providing an audible indication of an event associated with the control tone through control tone module 320. The hearing aid device 300 is therefore able to provide an audible indication of an event, such as by playing a user alert sound, where a user might otherwise not hear an indication of the event using conventional ringtones or alert sounds.

Figure 4:
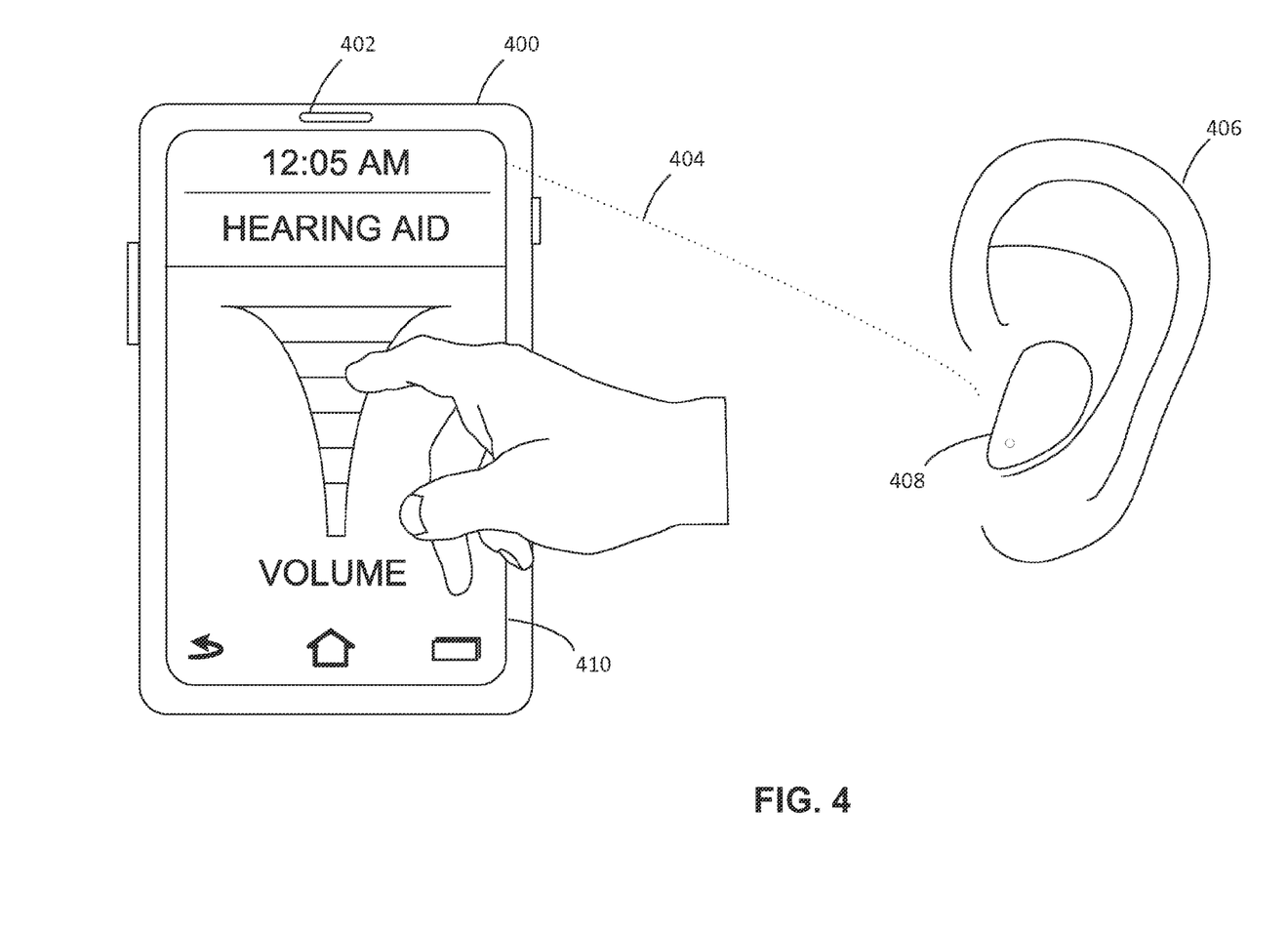
FIG. 4 is a block diagram illustrating a computing device that interacts with a hearing aid device, consistent with an example embodiment.

FIG. 4 is a block diagram illustrating a computing device that interacts with a hearing aid device, consistent with an example embodiment. Computing device 400 is shown as a smartphone, but in other examples may be another type of mobile computing device, such as a tablet computer, global positioning system (GPS) device, or other computerized system. Computing device 400 uses speaker 402 to communicate audio signals including one or more control tones 404 to a hearing aid device 408 worn by a user 406 (only a portion of the user is shown).

The computing device 400 executes one or more applications, such as a telephone application or a hearing aid application, or one or more services, such as a notification service, that are operable to output a user alert sound indicating an event, such as a phone call, a text message, or a calendar appointment, for example. When an event associated with a user alert sound occurs, the computing device 400 outputs an alert sound through speaker 42. The output user alert sound includes a control tone that hearing aid 408 detects and identifies as associated with a known event. In response to detecting the control tone, hearing aid device 408 generates an audible indication of the event and outputs the audible indication via a speaker so that user 406 can hear the audible indication of the event. The audible indication is designed to be audible to the hearing aid user. For example, the audible indication may be at a particular frequency that is less affected by hearing loss, or otherwise particularly tailored to the needs of the hearing aid user. The hearing aid device 408 generating the audible indication may enable a user to hear an audible indication of the event where the user might otherwise not be able to clearly hear the user alert sound output by speaker 402 of the computing device 400. For example, the techniques of this disclosure may be useful where the user is in a noisy environment, or where the user alert sound comprises largely frequencies outside typical speech frequencies and therefore may be attenuated relative to speech frequencies in hearing aid device 408.

FIG. 4 further illustrates a touchscreen display 410 showing an example hearing aid application, such as hearing aid application 222 of FIG. 2. In this example, the hearing aid application is displaying a volume adjustment screen, operable to receive an indication of user input through a user touch detected at touchscreen display 410 at various positions along a volume slider. In this example, the touch location along the slider corresponds to a desired volume setting for the hearing aid device 408, and can be used to cause the hearing aid application to cause computing device 400 to send control tone(s) to hearing aid device 408, which causes hearing aid device 408 to change the volume of hearing aid device 408. For example, when computing device 400 receives an indication of user input changing an operational parameter or setting of hearing aid device 408 such as volume, the hearing aid application generates a control tone associated with the changed setting and causes computing device 400 to output the control tone. Hearing aid device 408 is operable to receive and decode the control tone, and to change one or more settings of hearing aid device 408 based on information encoded in the received control tone.

Figure 5:
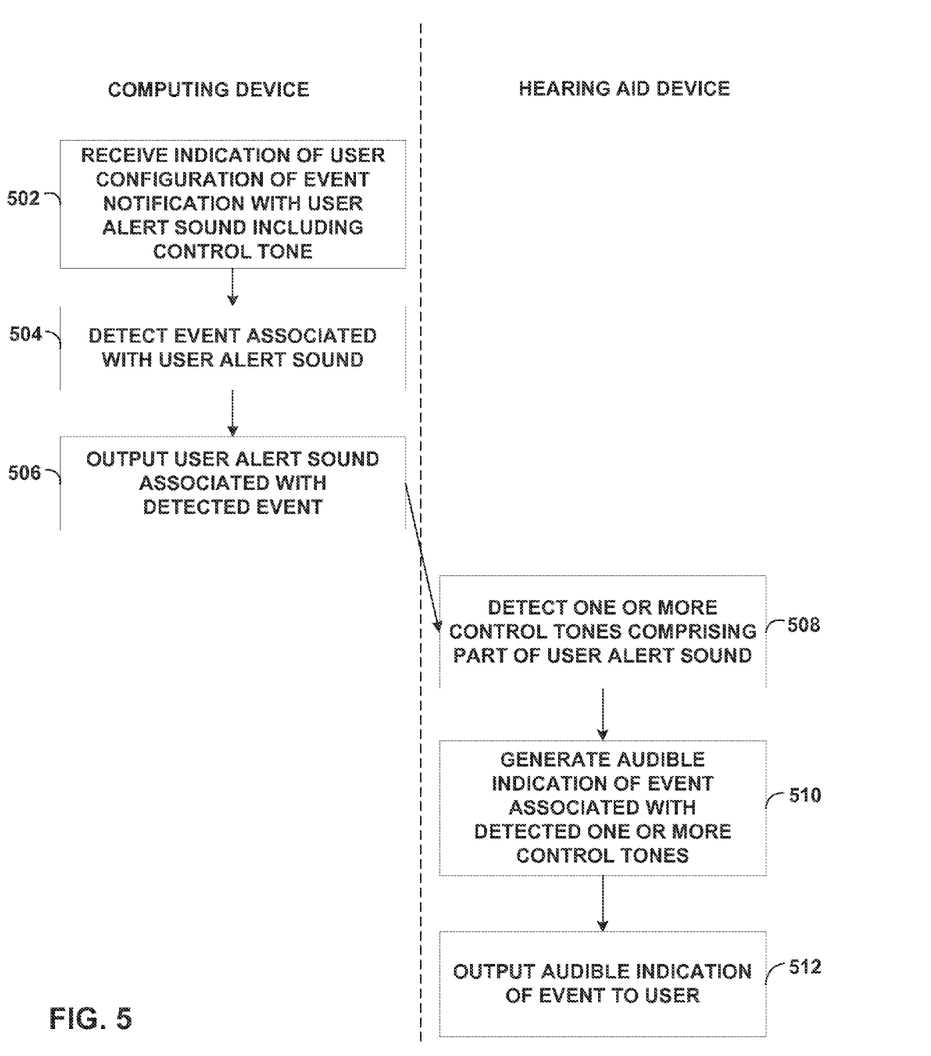
FIG. 5 is a flowchart illustrating example operation of a computing device and a hearing aid device, consistent with an example embodiment.

FIG. 5 is a flowchart illustrating example operation of a computing device and a hearing aid device, consistent with an example embodiment. FIG. 5 shows an example method of employing user alert sounds that include control tones to provide notification of the event to a hearing aid device operable to generate an audible indication of the event in response to detecting the control tones. FIG. 5 will be described for purposes of example with respect to the FIGS. 1-4.

A computing device (e.g., a mobile device, mobile smartphone, tablet, or other device) receives data indicative of inputs from a user of the computing device, such as inputs to configure the computing device so that one or more device events are associated with a user alert sound that includes a control tone (502). The one or more device events, in some examples, comprise events such as calendar reminders, received text messages, alarm tones, and telephone ringtones. In other examples the one or more device events comprise events such as confirmation of receiving inputs from a user to change a hearing aid device setting using a hearing aid application executing on the computing device. Configuring the computing device event notification with a user alert sound including a control tone may include adding a control tone to an existing user alert sound in some examples, or adding new user alert sounds that include control tones in other examples. The user alert sounds are associated with the event, such as by choosing a ringtone from a telephone application, configuring a text message alert sound in an operating system, or associating a user alert sound with an event in a notification service or application.

The computing device detects an event associated with the user alert sound (504), such as a phone application of the computing device detecting an incoming call or a notification center application of the computing device receiving a notification of an event associated with a user alert sound. The computing device outputs the user alert sound associated with the detected event (506), such as by selecting the appropriate configured tone from a tone library and outputting the user alert sound to be played by a speaker of the computing device. The user alert sound in some examples may be difficult for a hearing aid device user to hear, such as when the user is in a noisy environment or when the user alert sound contains significant audio content outside of normal speech frequencies amplified by the hearing aid device.

The hearing aid device receives the user alert sound and detects one or more control tones comprising part of the user alert sound (508). In response to detecting the one or more control tones, the hearing aid device associates the received control tone with a computing device event, such as by comparing the control tones to data stored at the hearing aid device. In some examples, the control tone does not indicate the specific event, while in other examples the control tone includes information identifying the computing device event. The hearing aid device generates an audible indication of the event associated with the detected one or more control tones (510), and outputs the audible indication of the event to the hearing aid device user (512) such as by playing the audible indication of the event through a speaker of the hearing aid device. The audible indication may be designed to be heard by the hearing aid device user. For example, the audible indication may be played at a frequency that is more easily heard by the hearing aid device user, and/or a frequency that the hearing aid device amplifies.

The audible indication of the event is in some examples associated with the particular control tone that the hearing aid device receives, and therefore associated with a particular computing device event associated with the control tone. In other words, hearing aid device may associate different types of computing device events with different audible indications, allowing the user to distinguish between various events, such as distinguishing a ringing telephone application event from a calendar reminder event, so that the user may respond to the events differently. In other examples, a single event notification is used, or distinctions between various types of events are limited, such that a user may simply be prompted to interact with the computing device to determine what type of event resulted in the audible indication of the event output by the hearing aid device.

In some examples, the elements 502-512 of FIG. 5 occur in various orders, or may omit some elements or include additional elements. For example, the control tone may be repeated several times upon occurrence of the detected event, and several control tones may be sent from the computing device to the hearing aid device (e.g., sequentially or concurrently) before the hearing aid device detects and/or responds to the control tones at 508. In such an example, the hearing aid device may be configured to respond only to the first instance of a received control tone indicating a particular event over a certain period of time, such as five seconds, 10 seconds, 15 seconds, or 30 seconds.

The examples described herein may be implemented, at least in part, in hardware, software, firmware, or any combination thereof. For example, various elements of the described examples may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various methods described herein. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The examples described herein may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable storage media. In some examples, an article of manufacture may include one or more computer-readable storage media.

A computer-readable storage medium comprises a non-transitory medium, and the term "non-transitory" indicates that the storage medium is not embodied in a carrier wave or a propagated signal. In certain examples, a non-transitory storage medium may store data that can, over time, change (e.g., in RAM or cache).

Although specific embodiments have been illustrated and described herein, it will be appreciated by those of ordinary skill in the art that any arrangement that achieve the same purpose, structure, or function may be substituted for the specific embodiments shown. This application is intended to cover any adaptations or variations of the embodiments described herein. These and other embodiments are within the scope of the following claims and their equivalents.

The invention claimed is:

1. A method comprising:
    detecting, by a computing device, an event associated with an alert sound;
    responsive to detecting the event and by the computing device, identifying an alert sound associated with the detected event, wherein the alert sound comprises one or more control tones configured to communicate occurrence of the event to a hearing aid device within audio range of the computing device; and
    outputting, by the computing device and to be played by a speaker operatively coupled to the computing device, the alert sound comprising the one or more control tones, wherein the alert sound includes encoded identification information that, when received by the hearing aid device, is compared to identification information configured in the hearing aid device to determine if the hearing aid device is a target of the alert sound.

2. The method of claim 1, wherein the event comprises one of a received telephone call, a received text message, a calendar appointment, an alarm, and a notification.

3. The method of claim 1, wherein the at least one of the control tones is configured to modify an operational parameter of the hearing aid device.

4. The method of claim 3, wherein the operational parameter of the hearing aid device comprises one or more of a hearing aid volume level, a noise suppression level, and a frequency to be amplified.

5. The method of claim 3, wherein detecting occurrence of the event comprises detecting, at a presence-sensitive display operably coupled to the computing device, user input indicating a modification to an operational parameter of the hearing aid device.

6. The method of claim 1, further comprising:
prior to detecting the event, detecting, at a presence-sensitive display operably coupled to the computing device, user input associating the event with the user alert sound comprising the one or more control tones.

7. The method of claim 1, wherein the one or more control tones comprise an inaudible portion of the alert sound.

8. The method of claim 1, wherein the one or more control tones comprise other encoded information.

9. The method of claim 8, where the other encoded information is encoded using one of frequency modulation, phase modulation, or amplitude modulation.

10. The method of claim 8, wherein the other encoded information comprises error checksum encoding.

11. The method of claim 8, wherein the other encoded information comprises information identifying a type of the event.

12. The method of claim 1, wherein the encoded identification information comprises information specifying one of a user identifier and a device identifier.

13. The method of claim 1, wherein outputting the alert sound comprises repeating at least one of the control tones during outputting of the alert sound.

14. The method of claim 1, wherein the computing device comprises a mobile computing device.

15. A device comprising:
a speaker; and
at least one processor, configured to:
detect an event associated with an alert sound;
responsive to detecting the event, identify the alert sound associated with the detected event, wherein the alert sound comprises one or more control tones configured to communicate occurrence of the event to a hearing aid device within audio range of the device; and
output, via the speaker, the alert sound,
wherein the one or more control tones include encoded identification information that, when received by the hearing aid device, is compared to identification information configured in the hearing aid device to determine if the hearing aid device is a target of the alert sound.

16. The device of claim 15, wherein the device comprises a mobile computing device.

17. A method comprising:
detecting, by a hearing aid device, one or more control tones comprising at least part of an alert sound, the alert sound received from a computing device and associated with a computing device event, wherein detecting includes decoding, from the alert sound, encoded identification information and comparing the decoded identification information to identification information configured in the hearing aid device to determine if the hearing aid device is a target of the alert sound;
in response to determining that the hearing aid device is a target of the alert sound, generating an audible indication associated with the detected one or more control tones, the audible indication comprising a sound different than the one or more control tones; and
outputting the audible indication via a speaker of the hearing aid device to audibly notify a user of the hearing aid device of the computing device event.

18. The method of claim 17, wherein the encoded identification information comprises one of a user identifier and a device identifier.

19. The method of claim 17, wherein the computing device event comprises one of a received telephone call, a received text message, a calendar appointment, an alarm, and a notification.

20. The method of claim 17,
wherein the computing device event comprises one of a user-initiated change in hearing aid volume level, a user-initiated change in noise suppression level, and a user-initiated change in frequency to be amplified, and wherein the control tones are configured to modify an operational parameter of the hearing aid device, the method further comprising:
responsive to receiving the one or more control tones and by the hearing aid device, modifying the operational parameter of the hearing aid device.

21. The method of claim 17, wherein outputting comprises outputting the audible indication in response to detecting that the one or more control tones are repeated a specified number of times.

22. The method of claim 17, further comprising:
decoding information encoded in the one or more control tones using at least one of frequency modulation, phase modulation, amplitude modulation and error checksum encoding.

23. A hearing aid device comprising:
a processor, configured to:
detect one or more control tones comprising at least part of an alert sound, the alert sound received from a computing device and associated with a computing device event, wherein the one or more control tones include encoded identification information;
responsive to detecting the one or more control tones and to determining, based on a comparison of the received identification information to identification information stored in the hearing aid device, that the hearing aid device is a target of the alert sound, generate an audible indication associated with the detected one or more control tones, the audible indication comprising a sound different than the one or more control tones; and
output the audible indication via a speaker of the hearing aid device to audibly notify a user of the hearing aid device of the computing device event.

24. The method of claim 17, wherein the computing device event is user-initiated and wherein the audible indication is selected to notify the user of the hearing aid device of the occurrence of the user-initiated event.

25. The method of claim 17, wherein detecting further includes determining a setting change for the hearing aid device as a function of the alert sound.

26. The method of claim 17, wherein outputting the audible indication includes tailoring the audible indication to hearing needs of the user.

* * * * *